D. JEWETT.
Axle Box.

No. 102,127.                    Patented April 19, 1870.

Witnesses,
N. W. Stearns
W. J. Cambridge

Inventor
David Jewett

United States Patent Office.

DAVID JEWETT, OF LYNN, MASSACHUSETTS.

Letters Patent No. 102,127, dated April 19, 1870.

IMPROVED AXLE-BOX FOR CARRIAGES.

The Schedule referred to in these Letters Patent and making part of the same.

*To all whom it may concern:*

Be it known that I, DAVID JEWETT, of Lynn, in the county of Essex and State of Massachusetts, have invented certain Improvements in Axles and Axle-Boxes for Carriages; and I hereby declare that the following is a full, clear, and exact description thereof, reference being had to the accompanying drawings making part of this specification, in which—

Figure 1:
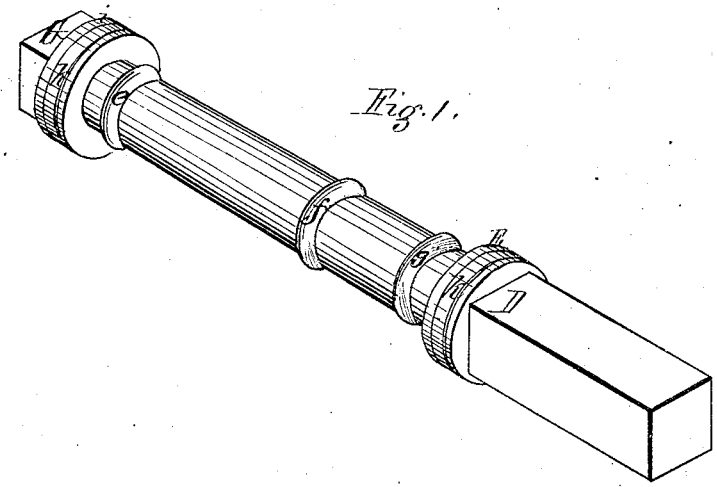
Figure 1 is a perspective view of a carriage-axle and its nut, with my improvements applied thereto.
Figure 2:
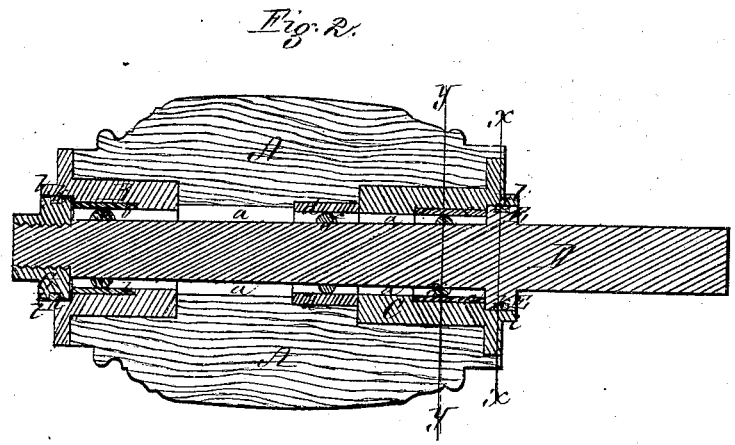
Figure 2 is a longitudinal central section, showing the application of my invention to a carriage-hub.
Figure 3:
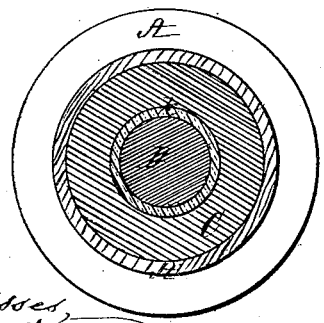
Figure 3 is a vertical section on the line $x\,x$ of fig. 2.
Figure 4:
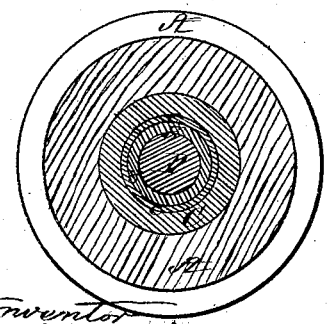
Figure 4 is a vertical section on the line $y\,y$ of fig. 2.

My invention consists in an axle provided with a grooved collar, and with a grooved nut for the reception of elastic packing to exclude the air, dust, &c., from the axle-box, and to prevent the lubricating material from escaping therefrom; and My invention also consists in providing that portion of the axle which enters the box with two or more collars or circular rings of hardened steel, which bear upon hardened steel surfaces within the interior of the box, the bearing-surfaces of the said rings being of limited extent, thus relieving much of the friction experienced in axles of the ordinary construction.

To enable others skilled in the art to understand and use my invention, I will proceed to describe the manner in which I have carried it out.

In the said drawings—

A is a carriage-hub, within the ends of which are snugly fitted the metallic boxes B C, provided with thimbles or bushings, $b\,c$, of hardened steel.

$d$ is also a thimble or bushing of hardened steel, fitted within the interior of the hub about half way between the inner ends of the bushings $b\,c$.

These bushings or thimbles serve as bearings for a corresponding number of circular rings $e, f, g$, of hardened steel, formed on the journal of the axle D, the object of this construction being to reduce the amount of bearing-surface in as great a degree as possible compatible with strength, thereby relieving much of the friction of the parts, and requiring to be seldom lubricated; the lubricating material consisting of powdered black-lead, which is placed around the axle in the chambers $a$ between the rings $e\,f$ and $f\,g$.

By using black-lead as a lubricating material, the heating of the parts is avoided.

The outer end of the journal of the axle is provided with a screw-thread, over which turns a nut, G, in the outer surface of the circular portion $i$ of which is cut an annular groove, while the inner end of the journal is provided with a circular collar, E, in the outer surface of which is also formed an annular groove; these grooves are for the reception of elastic packing, $k$, which, when the collar E and nut G are in place within the circular flanged recesses prepared for them in the outside of the boxes B C, snugly close the joints at these points, pressing outward against the flanges $l\,l$, thereby effectually excluding the dirt, dust, &c., and preventing the escape of the lubricating material.

It is evident that a continuous bushing may be employed, or that the whole of the axle-box, or its two parts B C, be composed of steel; and that my improvements may be applied to the shafting of machinery without departing from the spirit of my invention.

Claim.

What I claim as my invention, and desire to secure by Letters Patent, is—

The grooved collar E and the grooved nut G for the reception of elastic packing $k$, in combination with an axle, D, substantially as and for the purpose described.

Witness my hand this      day of March, A. D. 1870.

DAVID JEWETT.

Witnesses:
  N. W. STEARNS,
  W. J. CAMBRIDGE.